US006647164B1

(12) United States Patent
Weaver et al.

(10) Patent No.: US 6,647,164 B1
(45) Date of Patent: Nov. 11, 2003

(54) GIMBALED MICRO-MIRROR POSITIONABLE BY THERMAL ACTUATORS

(75) Inventors: Billy L. Weaver, Eagan, MN (US); Mike E. Hamerly, Vadnais Heights, MN (US); Robert G. Smith, Vadnais Heights, MN (US)

(73) Assignee: 3M Innovative Properties Company, St Paul, MN (US)

( * ) Notice: Subject to any disclaimer, the term of this patent is extended or adjusted under 35 U.S.C. 154(b) by 368 days.

(21) Appl. No.: 09/702,646

(22) Filed: Oct. 31, 2000

(51) Int. Cl.[7] .............................. G02B 6/26; G02B 6/42
(52) U.S. Cl. ....................... 385/16; 359/291; 359/224
(58) Field of Search .................... 385/16, 18; 359/224, 359/223, 291

(56) References Cited

U.S. PATENT DOCUMENTS

| | | |
|---|---|---|
| 4,954,789 A | 9/1990 | Sampsell |
| 4,975,729 A | 12/1990 | Gordon |
| 5,024,500 A | 6/1991 | Stanley et al. |
| 5,037,173 A | 8/1991 | Sampsell et al. |
| 5,109,459 A | 4/1992 | Eibert et al. |
| 5,208,880 A | 5/1993 | Riza et al. |
| 5,528,710 A | 6/1996 | Burton et al. |
| 5,646,768 A | 7/1997 | Kaeriyama |
| 5,646,928 A | 7/1997 | Wu et al. |
| 5,652,671 A | 7/1997 | Knipe et al. |
| 5,661,611 A | 8/1997 | Kim et al. |
| 5,745,271 A | 4/1998 | Ford et al. |
| 5,748,811 A | 5/1998 | Amersfoort et al. |
| 5,768,006 A | 6/1998 | Min et al. |
| 5,774,604 A | 6/1998 | McDonald |
| 5,786,915 A | 7/1998 | Scobey |
| 5,805,331 A | 9/1998 | Lee |
| 5,818,623 A | 10/1998 | Valette et al. |
| 5,862,003 A | 1/1999 | Saif et al. |
| 5,870,007 A | 2/1999 | Carr et al. |
| 5,872,880 A * | 2/1999 | Maynard .................. 385/88 |
| 5,877,889 A | 3/1999 | Um et al. |
| 5,878,177 A | 3/1999 | Karasan et al. |
| 5,886,811 A | 3/1999 | Min |
| 5,900,998 A | 5/1999 | Kim et al. |

(List continued on next page.)

FOREIGN PATENT DOCUMENTS

| | | |
|---|---|---|
| DE | 41 00 358 | 7/1992 |
| DE | 19500214 A | 7/1996 |
| EP | 0 569 187 A1 | 11/1993 |
| EP | 0 672 931 A1 | 9/1995 |
| EP | 0 713 117 A1 | 5/1996 |
| EP | 0 762 161 A1 | 3/1997 |
| EP | 0 783 124 A1 | 7/1997 |
| EP | 0 794 558 A1 | 9/1997 |

(List continued on next page.)

OTHER PUBLICATIONS

Reid et al., "A Surface Micromachined Rotating Micro–Mirror Normal to the Substrate", IEEE Conference on Optical MEMS, pp. 39–40 (1996).
Comtois et al., "Applications for Surface–Micromachined Polysilicon Thermal Actuators and Arrays", 58 Sensors and Actuators 19–25 (1997).
Koester et al., "MUMPS Design Handbook, Revision 5.0", Cronos Integrated Microsystems (2000).

(List continued on next page.)

*Primary Examiner*—Lynn D. Feild
*Assistant Examiner*—Brian S. Webb
(74) *Attorney, Agent, or Firm*—Bradford B. Wright

(57) ABSTRACT

A micro-mechanical device including a gimbaled micro-mirror position able by a one or more thermal actuators. The thermal actuators are not attached to the micro-mirror. Rather, the micro-mirror is retained to the substrate by one or more gimbals. The micrometer sized thermal actuators are capable of repeatable and rapid moving the micro-mirror out-of-plane to accurately and repeatably steer a beam of light.

20 Claims, 6 Drawing Sheets

U.S. PATENT DOCUMENTS

| | | | |
|---|---|---|---|
| 5,903,383 A | 5/1999 | Bernstein et al. | |
| 5,914,801 A | 6/1999 | Dhuler et al. | |
| 5,914,803 A | 6/1999 | Hwang et al. | |
| 5,923,798 A | 7/1999 | Aksyuk et al. | |
| 5,936,757 A | 8/1999 | Kim et al. | |
| 5,943,158 A | 8/1999 | Ford et al. | |
| 5,959,376 A | 9/1999 | Allen | |
| 5,959,749 A | 9/1999 | Danagher et al. | |
| 5,960,132 A | 9/1999 | Lin | |
| 5,960,133 A | 9/1999 | Tomlinson | |
| 5,962,949 A | 10/1999 | Dhuler et al. | |
| 5,963,367 A | 10/1999 | Aksyuk et al. | |
| 5,966,230 A | 10/1999 | Swartz et al. | |
| 5,974,207 A | 10/1999 | Aksyuk et al. | |
| 5,982,554 A | 11/1999 | Goldstein et al. | |
| 5,983,721 A | 11/1999 | Sulzberger et al. | |
| 5,994,159 A | 11/1999 | Aksyuk et al. | |
| 5,995,688 A | 11/1999 | Aksyuk et al. | |
| 5,999,303 A | 12/1999 | Drake | |
| 6,014,240 A | 1/2000 | Floyd et al. | |
| 6,016,217 A | 1/2000 | Dötzel et al. | |
| 6,020,272 A | 2/2000 | Fleming | |
| 6,028,689 A * | 2/2000 | Michalicek et al. | 359/224 |
| 6,031,946 A | 2/2000 | Bergmann et al. | |
| 6,035,080 A | 3/2000 | Henry et al. | |
| 6,044,056 A | 3/2000 | Wilde et al. | |
| 6,044,705 A | 4/2000 | Neukermans et al. | |
| 6,046,840 A | 4/2000 | Huibers | |
| 6,164,837 A | 12/2000 | Haake et al. | |
| 6,275,325 B1 * | 8/2001 | Sinclair | 359/291 |
| 6,366,414 B1 * | 4/2002 | Aksyuk et al. | 359/223 |
| 6,483,419 B1 | 11/2002 | Weaver et al. | |
| 6,531,947 B1 | 3/2003 | Weaver et al. | |
| 2002/0195674 A1 | 12/2002 | Weaver et al. | |

FOREIGN PATENT DOCUMENTS

| | | |
|---|---|---|
| EP | 0 771 121 A2 | 10/1997 |
| EP | 0 902 538 A2 | 3/1999 |
| EP | 0 911 659 A1 | 4/1999 |
| EP | 0 932 066 A1 | 7/1999 |
| EP | 0 961 150 A2 | 12/1999 |
| EP | 0 962 796 A2 | 12/1999 |
| WO | 96/07945 | 3/1996 |
| WO | 96/07952 A1 | 3/1996 |
| WO | 96/08059 | 3/1996 |
| WO | 96/18131 | 6/1996 |
| WO | 97/06617 | 2/1997 |
| WO | 98/07060 | 2/1998 |
| WO | 98/35258 | 8/1998 |
| WO | 99/38348 | 7/1999 |
| WO | 00/13210 | 3/2000 |
| WO | 00/14415 | 3/2000 |
| WO | 00/25160 | 5/2000 |
| WO | 00/52835 | 9/2000 |
| WO | 00/75710 A2 | 12/2000 |
| WO | 01/09653 A1 | 2/2001 |

OTHER PUBLICATIONS

Mossman et al., "New Reflective Display Based on Total Internal Reflection in Prismatic Microstructures".

Lin et al., "Lightwave Micromachines for Optical Cross-connects".

Zou et al., "Optical Properties of Surface Micromachined Mirrors with Etch Holes", 8 Journal of Microelectrical Systems 506–513 (1999) (Abstract).

Kopka et al., "Coupled U–Shaped Cantilever Actuators for 1×4 and 2×2 Optical Fibre Switches", 10 J. Micromech. Microeng. 260–264 (2000).

Reid et al., "Automated Assembly of Flip–Up Micromirrors", 66 Sensors and Actuators 292–298 (1998).

Riza et al., "Digitally Controlled Fault–Tolerant Multiwavelength Programmable Fiber–Optic Attenuator Using a Two–Dimensional Digital Micromirror Device", 24 Optics Letters 282–284 (1999).

Kolesar et al., "Implementation of Micromirror Arrays as Optical Binary Switches and Amplitude Modulators", 332 Thin Solid Films 1–9 (1998).

R. Syms, "Operation of Surface–tension Self–Assembled 3D Micro–Optomechanical Torsion Mirror Scanner", 35 Electronics Letters 1157–1158 (1999).

Lin et al., "High–Density Micromachined Polygon Optical Crossconnects Exploiting Network Connection–Symmetry", 10 IEEE Photonics Technology Letters 1425–1427 (1998).

Lee et al., "Free–Space Fiber–Optic Switches Based on MEMS Vertical Torsion Mirrors", 17 Journal of Lightwave Technology 7–13 (1999).

Yasseen et al., "A Rotary Electrostatic Micromotor 1×8 Optical Switch", 5 IEEE Journal of Selected Topics in Quantum Electronics 26–32 (1999).

Toshiyoshi et al., "Electromagnetic Torsion Mirrors for Self–Aligned Fiber–Optic Crossconnectors by Silicon Micromachining", 5 IEEE Journal of Selected Topics in Quantum Electronics 10–17 (1999).

Ford et al., "Wavelength Add–Drop Switching Using Tilting Micromirrors", 17 Journal of Lightwave Technology 904–911 (1999).

Aksyuk et al., "Low Insertion Loss Packaged and Fiber--Connectorized SI Surface–Micromachined Reflective Optical Switch", Solid State Sensor and Actuator Workshop pp. 79–82 (1998).

Lih et al., "Micromachined Free–Space Matrix Switches with Submillisecond Switching Time for Large–Scale Optical Crossconnect", Optical Fiber Communication Conference, pp. 147–148 (1998).

Behin et al., "Magnetically Actuated Micromirrors for Fiber–Optic Switching", Solid State Sensor and Actuator Workshop pp. 273–276 (1998).

Butler et al., "Scanning and Rotating Micromirrors Using Thermal Actuators", 3131 SPIE 134–144 (1997).

Fouquet et al., "Compact, Scalable Fiber Optic Cross–Connect Switches", IEEE WDM Components Conference, pp. 59–60 (1999).

Herzel Laor, "Construction and Performance of a 576×576 Single–Stage OXC", IEEE Lasers and Electro–Optics Society, pp. 481–482 (1999).

Goldstein et al., "Optical–Mems–Based Tail–End Switching for Restoration of Line–Rate Services", AT&T Labs–Research.

Chiou et al., "A Micromirror Device with Tilt and Piston Motions", 3893 SPIE 298–303 (1999).

Sumriddetchkajorn et al., "Micromachine–based Fault–Tolerant High Resolution High–Speed Programmable Fiber–Optic Attenuator", ThQ1–1 University of Central Florida 240–242.

Aksyuk et al., "Stress–induced Curvature Engineering in Surface–Micromachined Devices", 3680 SPIE 984–993 (1999).

Zou et al., "Optical Properties of Surface Micromachined Mirrors with Etch Holes", 8 Journal of Microelectromechanical systems 506–513 (1999).

Cowan et al., "Vertical thermal actuators for micro–optp–elecro–mechanical systems", Proceedings of the SPIE, Spie, Bellingham, VA, vol.3226, 1997, pp. 137–146.

* cited by examiner

GIMBALED MICRO-MIRROR POSITIONABLE BY THERMAL ACTUATORS

FIELD OF THE INVENTION

The present invention relates generally to a micromechanical device for steering and manipulating beams of light, and in particular, to a gimbaled micro-mirror positionable by one or more thermal actuators.

BACKGROUND OF THE INVENTION

Beam steering devices are found in a variety of products, including laser bar scanners, CD-ROM heads, laser printers, optical switches, robotic vision scanners, optical choppers, optical modulators, and display devices. Many micromirrors are designed using any one (or combination) of only three primary styles of operation. First, the "phase-only" piston-style device, known as the flexure-beam micromirror, operates such that the motion of the reflective surface is along an axis orthogonal to its plane. The reflective mirror surface is attached to several identical flexures that support the mirror uniformly around its perimeter. As a result the direction of propagation is preserved and only the phase is modified by lengthening or shortening the optical path of the incident light.

The second design is a cantilever micro-mirror that is probably the most common style. The mirror of this device is attached at one end by as little as a single flexure or hinge and is deflected upward or downward at an angle as the device is actuated. This device alters the direction of propagation of an incident beam of light and also creates a non-uniform phase-front in the reflected light due to the slanting of the mirror surface.

The third design is the torsion-beam micro-mirror that is similar to the cantilever device with the exception that the mirror is attached by two flexures or hinges opposite each other. As a result, this device rotates along the longitudinal axis defined by these flexures. The mirror surface tilts as with the cantilever device, but it can be tilted in two directions along both sides of the flexures rather than just one. These mirrors are typically limited in movement to one or two directions. There is need and market for micromirrors that have sufficient multi-movement capability as to overcome the above prior art shortcomings.

Coupling actuators with micro-mirrors allows for moving these devices out of the plane of the substrate to steer the light beam. Various types of actuators, including electrostatic, piezoelectric, thermal and magnetic have been used for this purpose. For example, U.S. Pat. No. 6,028,689 (Michalicek et al.) discloses a multi-motion micro-mirror manipulated by electrostatic potential.

A device with a micro-mirror, four thermal actuators and four torsion bars that connect the mirror and the actuator is described by Chiou et al. in "A Micromirror Device with Tilt and Piston Motions", v.3893, SPIE, pp.298–303 (1999). Attaching the actuators to the micro-mirror can reduce the range of motion.

What is needed is a faster, more precise and compact apparatus for steering beams of light.

BRIEF SUMMARY OF THE INVENTION

The present invention relates generally to a micromechanical device for steering beams of light. The micromechanical device includes a gimbaled micro-mirror with a mirror mechanically coupled to the surface of the substrate by one or more gimbals. The thermal actuators are positioned to engage with, but are not attached to, the mirror. The gimbaled micro-mirror is positionable by a plurality of thermal actuators through two or more degrees of freedom. The micro-mirror is typically positionable through pitch, roll and lift.

The thermal actuators are capable of repeatable and rapid movement of the micro-mirror to steer a beam of light. The present gimbaled micro-mirror has an extremely small mass and high frequency response while at the same time exhibiting high tolerance to vibration noise. The micromechanical device of the present invention has many uses related to optical switching including beam steering, shaping and scanning or projection applications, as well as for optical communication.

In one embodiment, the micro-mechanical device for steering beams of light comprises at least one mirror constructed on a surface of the substrate. At least one gimbal mechanically couples the mirror to the surface of the substrate in a neutral position. At least one thermal actuator is constructed on the surface of the substrate adjacent to the mirror. The thermal actuator has a free end positioned to engage the mirror, but is not attached to the mirror. The thermal actuator is adapted to move the mirror out of the neutral position. The neutral position is typically an in-plane configuration. The mirror is typically in an out-of-plane configuration when the thermal actuators are in an activated position.

In one embodiment, two or more thermal actuators are adapted to move the mirror through at least two degrees of freedom relative to the surface of the substrate. In some embodiments, the gimbal suspends the mirror over the surface of the substrate.

In one embodiment, the free end slides along a lower surface of the mirror during movement between the unactivated position and the activated position. In another embodiment, the mirror can include a plurality of outriggers positioned to mechanically engage with the free ends of the thermal actuators.

The mirror may optionally include a plurality of supports extending distally from a perimeter of the mirror. A plurality of pads attached to the supports are positioned to engage with the surface of the substrate when the thermal actuators are in an unactivated position. The pads may optionally be located on the surface of the substrate. Alternatively, the pads operate as end-stops when the thermal actuators are in an activated position.

In one embodiment, the mirror is rectangular and at least one thermal actuator is located at each corner thereof The gimbal may optionally include at least one first arm extending distally from the mirror, a member attached to a distal end of the first arm, and a second arm extending from the member to an anchor on the surface of the substrate. In one embodiment, the first arm is perpendicular to the mirror. In another embodiment, the first arm is parallel to the second arm.

The thermal actuator typically includes at least one hot arm having a first end anchored to the surface and a distal end located above the surface. A cold arm having a first end is anchored to the surface and a distal end. The cold arm is located above the hot arm relative to the surface. A member is mechanically and electrically coupling the distal ends of the hot and cold arms. The member includes a free end configured to engage with the mirror The mirror is moved when current is applied to at least the hot arm. An array of mirrors can be constructed on the surface of the substrate.

The present invention is also directed to an optical switch comprising at least one input optical fiber and one or more output optical fibers. The present micro-mechanical device for steering beams of light is positioned to selectively direct an optical signal projecting from the input optical fiber to any of the output optical fibers.

BRIEF DESCRIPTION OF THE SEVERAL VIEWS OF THE DRAWING

Further features of the invention will become more apparent from the following detailed description of specific embodiments thereof when read in conjunction with the accompany drawings.

DETAILED DESCRIPTION OF THE INVENTION

Figure 1:
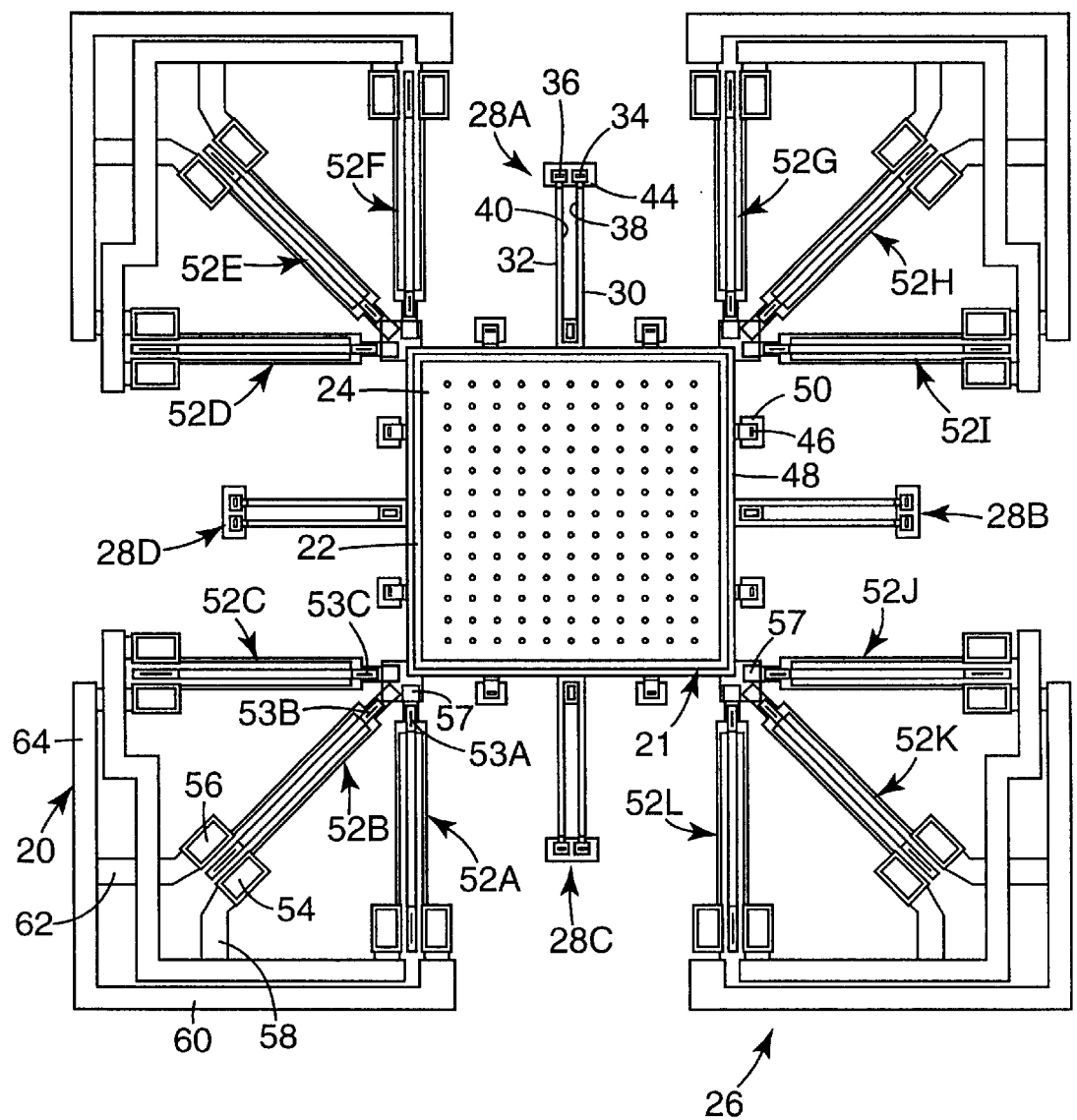
FIG. 1 is a top view of a micro-mechanical device in accordance with the present invention.

The present invention relates to a micro-mechanical device comprising a gimbaled micro-mirror positionable by one or more thermal actuators. As used herein, "micro-mechanical device" refers to micrometer-sized mechanical, opto-mechanical, electromechanical, or opto-electro-mechanical devices constructed on the surface of a substrate. The present invention will be described primarily in relation to a micro-mechanical device that includes at least one thermal actuator and a gimbaled micro-mirror, although other micro-mechanical devices will also be discussed. The thermal actuators are not attached to the micro-mirror. Rather, the micro-mirror is retained to the substrate by one or more gimbals. The micrometer sized thermal actuators are capable of repeatably and rapidly moving the micro-mirror out-of-plane to accurately and repeatably steer a beam of light. As used herein, "thermal actuator" refers to a micro-mechanical device having one or more members that are displaced by current induced thermal expansion.

Various technologies for fabricating micro-mechanical devices are available such as for example the Multi-User MEMS Processes (MUMPs) from Cronos Integrated Microsystems located at Research Triangle Park, North Carolina. One description of the assembly procedure is described in "MUMPs Design Handbook", revision 5.0 (2000) available from Cronos Integrated Microsystems.

Polysilicon surface micromachining adapts planar fabrication process steps known to the integrated circuit (IC) industry to manufacture micro-electro-mechanical or micro-mechanical devices. The standard building-block processes for polysilicon surface micromachining are deposition and photolithographic patterning of alternate layers of low-stress polycrystalline silicon (also referred to a polysilicon) and a sacrificial material (e.g., silicon dioxide or a silicate glass). Vias etched through the sacrificial layers at predetermined locations provide anchor points to a substrate and mechanical and electrical interconnections between the polysilicon layers. Functional elements of the device are built up layer by layer using a series of deposition and patterning process steps. After the device structure is completed, it can be released for movement by removing the sacrificial material using a selective etchant such as hydrofluoric acid (HF) which does not substantially attack the polysilicon layers.

The result is a construction system generally consisting of a first layer of polysilicon which provides electrical interconnections and/or a voltage reference plane, and additional layers of mechanical polysilicon which can be used to form functional elements ranging from simple cantilevered beams to complex electromechanical systems. The micro-mirror is typically located in-plane with the substrate. As used herein, the term "in-plane" refers to a configuration generally parallel to the surface of the substrate and the terms "out-of-plane" refer to a configuration greater than zero degrees to about ninety degrees relative to the surface of the substrate. Since the entire process is based on standard IC fabrication technology, a large number of fully assembled devices can be batch-fabricated on a silicon substrate without any need for piece-part assembly.

FIG. 1 is a top view of a micro-mechanical device 20 including a gimbaled micro-mirror 21 and one or more thermal actuators 52A–52L (referred to collectively as "52") in accordance with the present invention. Mirror 22 on the gimbaled micro-mirror 21 is formed so that surface 24 is highly reflective. The mirror 22 is retained to substrate 26 by a plurality of torsional hinges, flexures, or gimbals 28A–28D (referred to collectively as "28"). As used herein, "gimbal" refers to a micro-mechanical device that mechanically couples a mirror or other structure to a substrate while permitting movement through at least two degrees of freedom (typically pitch, roll and lift) relative to the surface of the substrate.

In the illustrated embodiment, the mirror 22 is generally square and the gimbals 28 are located along the four sides thereof The shape of the mirror, the number of gimbals and the location of gimbals can vary with the application of the gimbaled micro-mirror 21. For example, the gimbals 28 can be located at the corners of the gimbaled micro-mirror 21. The micro-mirrors 21 of the present invention are preferably shaped to permit a closely packed array, such as angular shapes including triangular, rectangular or have five or more sides, hexagonal, octagonal and the like. Alternatively, the gimbaled micro-mirror 21 may also be circular.

Figure 3:
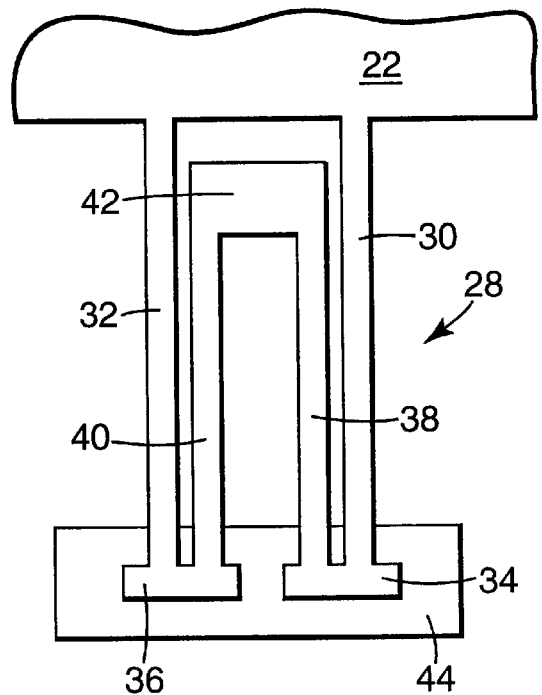
FIG. 3 is a top view of a gimbal in accordance with the present invention.

As best illustrated in FIG. 3, the gimbals 28 each includes a pair of first arms 30, 32 cantilevered from the mirror 22 to members 34, 36, respectively. Second arms 38, 40 are cantilevered from the members 34, 36 to the anchor 42. Although the arms 32, 40 and 30, 38 are generally perpendicular to the mirror 22 and generally parallel in the illustrated embodiment, this configuration is not required. The arms 30, 32, 38, 40 can be at an angle with respect to the mirror 22 and/or with respect to each other. Additionally, the arms 30, 32, 38, 40 can be curvilinear in shape. In one embodiment, the gimbals 28 suspend the mirror 22 over the surface of the substrate 26. In an alternate embodiment, the mirror 22 rests on the surface of the substrate 26, but is moveably retained to the substrate 26 by the gimbals 28.

Pads 44 are optionally located under the members 34, 36 to support the arms 30, 32, 38, 40. The pads 44 can also serve as limits or end-stops on the deflection of the arms 30, 32, 38, 40 and/or the mirror 22. The resistance and stiffness of the gimbals 28 during operation can be modified by increasing or decreasing the number, length and cross-sectional area of arms and a variety of other factors. For example, the anchor 42 can be moved closer to the members 34, 36. In an alternate embodiment, the arms 32, 40 can be eliminated.

Turning back to the illustrated embodiment of FIG. 1, a plurality of supports or outriggers 46 extend from a perimeter 48 of the mirror 22. In one embodiment, the supports 46 include pads 50 that engage with the surface of the substrate 26 in a neutral position. In an alternate embodiment, the pads 50 are attached to the surface of the substrate 26. In another embodiment, the pads 50 also serve as limits or end-stops for movement of the mirror 22. In another embodiment, the pads 50 maintain the mirror 22 in a fixed and repeatable relationship relative to the substrate 26 when in the neutral position.

As used herein, "neutral position" refers to the relationship of the mirror relative to the surface of the substrate when the thermal actuators are in an unactivated position. In one embodiment, outriggers 46 rest on the pads 50 in the neutral position. The neutral position can be also the in-plane configuration or the out-of-plane configuration.

The plurality of thermal actuators 52 are located around the perimeter of the mirror 22. The number, location and configuration of the thermal actuators 52 can vary with the application. In the illustrated embodiment, the thermal actuators 52 are located at the corners of the square mirror 22.

Free ends 53 of the thermal actuators 52 are positioned under supports 57 located at the corners of the mirror 22, but are not attached to the supports 57. The mirror 22 is attached to the substrate 26 by the gimbals 28 independent of the actuators 52. When any of the thermal actuators 52 are activated, one or more of the free ends 53 engage with the adjacent support 57 and raise the mirror 22 out-of-plane (see FIG. 2). When the thermal actuators 52 are in the unactivated position, the mirror 22 returns to a neutral position (see FIG. 1). The mirror 22 substantially returns to a neutral position when actuators 52 are in the unactivated position due to torsional forces of the gimbal. In one embodiment, the mirror 22 can be assisted back to the neutral position by an electrostatic force.

Figure 2:
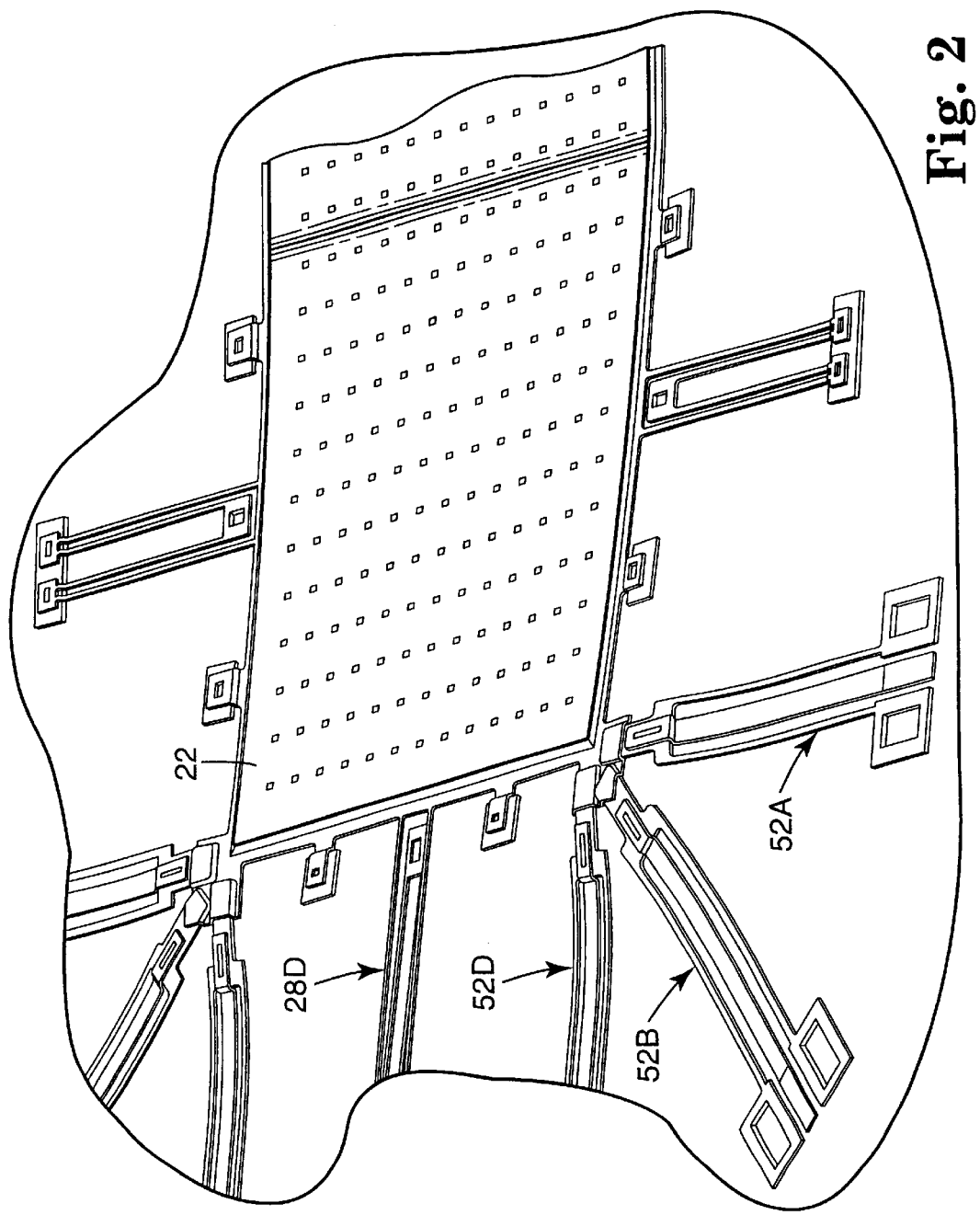
FIG. 2 is a perspective view of the micro-mechanical device of FIG. 1 in the activated position.

Each of the thermal actuators 52 includes one or more anchors 54, 56. Electrical trace 58 connects anchor 54 to grounding trace 60. Electrical trace 62 connects anchor 56 to a source of current 64. As illustrated in FIG. 2, by selectively applying current to some of the thermal actuators 52, the mirror 22 can be moved out-of-plane in pitch and/or roll, or a combination thereof As the thermal actuators 52A, 52B, 52C move to the out-of-plane configuration, the free ends 53A–53C engage with the support 57 to raise the mirror 22. The actuators 52 can also lift the mirror 22 off of the substrate 26, either parallel to or out-of-plane with respect to the substrate 26.

In some embodiments, the free ends 53A–53C move through an arc in the activated position so that there is some lateral displacement (parallel to the surface of the substrate) of the free ends 53 relative to the support 57. Consequently, the free ends 53 may slide along the lower surface of the support 57 (or the mirror 22) as the mirror 22 is raised. Some or all of the gimbal 28 are deformed to compensate for the displacement of the mirror 22. Since the free ends 53A–53C are not attached to the supports 57, the mirror 22 can be moved with less force and greater accuracy.

Alternate thermal actuators are disclosed in commonly assigned U.S. Patent applications entitled "Direct Acting Vertical Thermal Actuator", filed Sep. 12, 2000, Ser. No. 09/659,572; "Direct Acting Vertical Thermal Actuator with Controlled Bending", filed Sep. 12, 2000, Ser. No. 09/659,798; and "Combination Horizontal and Vertical Thermal Actuator", filed Sep. 12, 2000, Ser. No. 09/659,282.

Figure 4:
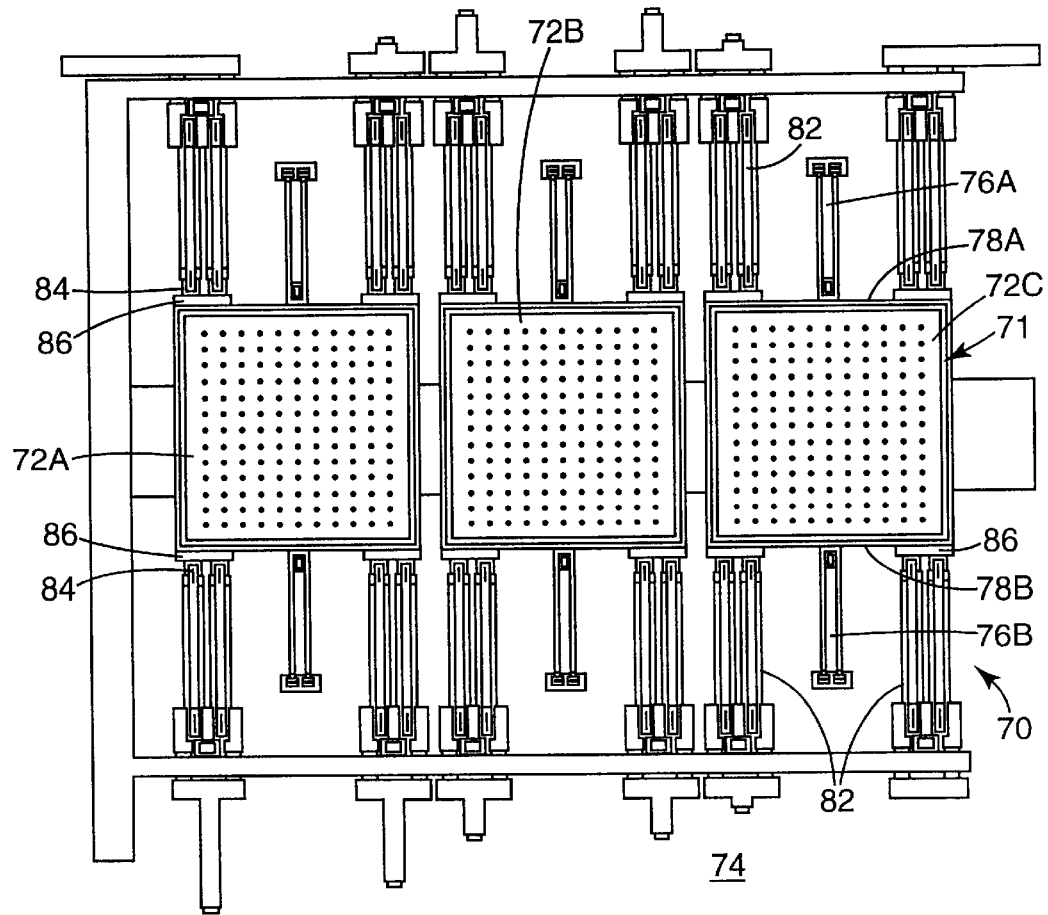
FIG. 4 is a top view of an alternate micro-mechanical device in accordance with the present invention.

FIG. 4 illustrates micro-mechanical device 70 including an array of gimbaled micro-mirrors 71 in accordance with the present invention. Each of the mirrors 72A, 72B, 72C (referred to collectively as "72") is mechanically coupled to the surface of substrate 74 by a pair of gimbals 76A, 76B located along opposite side edges 78A 78B of the mirrors 72. The mirrors 72 are suspended or coupled to the substrate 74 independent of actuators 82. Locating the gimbals 76A, 76B along the side edges 78A, 78B allows for a compact arrangement of the mirrors 72A, 72B, 72C.

One or more thermal actuators 82 are located along the side edges 78A, 78B of the mirrors 72. In the illustrated embodiment, the thermal actuators 82 are located near the corners of the mirrors 72. Free ends 84 of the actuators are not attached to the mirrors 72. Rather, the free ends 84 are located underneath supports or outriggers 86 that are attached to the mirrors 72. The free ends 84 slide along a bottom surface of the supports 86 to move the mirror 72 to the out-of-plane configuration, as discussed in connection with FIGS. 1–3.

FIGS. 5 through 9 illustrate an exemplary embodiment of a thermal actuator 150 suitable for use in the present invention. As used herein, "thermal actuator" refers to a thermally activated micro-mechanical device capable of repeatably moving an optical device, such as the present micro-mirror 22, between an in-plane position and an out-of-plane position. In the exemplary embodiment, the thermal actuator 150 is designed to provide controlled bending. As used herein, "controlled bending" refers to bending that occurs primarily at a discrete location, rather than being distributed along the beams of the thermal actuator.

Figure 8:
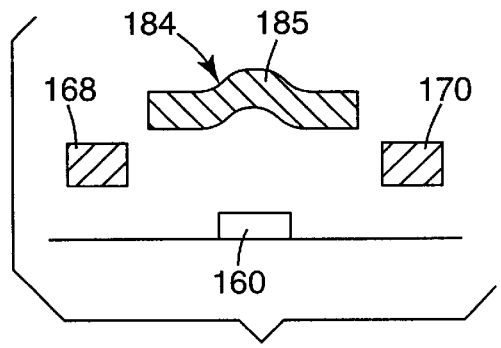
FIG. 8 is a sectional view of the thermal actuator of FIG. 5.

The thermal actuator 150 is disposed in-plane on a surface of a substrate 152 typically comprising a silicon wafer 154 with a layer of silicon nitride 156 deposited thereon. The actuator 150 includes a first layer 160 of polysilicon located on the layer of silicon nitride 156. As best seen in FIG. 8, the first layer 160 comprises a bump that forms the reinforcing member 185 in the cold beam 184. A second layer of polysilicon 162 is configured to have first and second anchors 164, 166 and a pair of beams 168, 170 arranged in a cantilever fashion from the anchors 164, 166 respectively.

Figure 5:
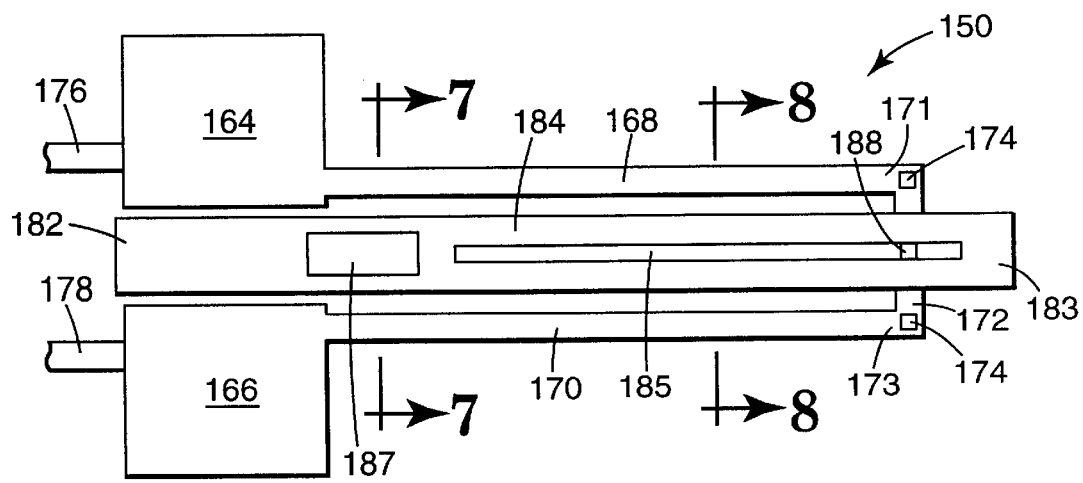
FIG. 5 is a top view of a thermal actuator for use in the gimbal micro-mirror in accordance with the present invention.
Figure 6:
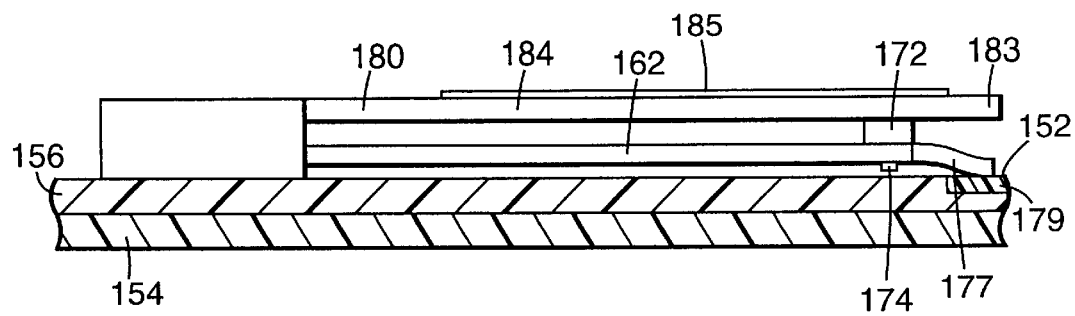
FIG. 6 is a side view of the thermal actuator of FIG. 5.

In the embodiment illustrated in FIG. 5, the anchors 164, 166 include electrical contacts 176, 178 formed on the substrate 152 adapted to carry electric current to the beams 168, 170. The traces 176, 178 typically extend to the edge of the substrate 152. Alternatively, a wide variety of electric contact devices and/or packaging methods such as a ball grid array (BGA), land grid array (LGA), plastic leaded chip carrier (PLCC), pin grid array (PGA), edge card, small outline integrated circuit (SOIC), dual in-line package (DIP), quad flat package (QFP), leadless chip carrier (LCC), chip scale package (CSP) can be used to deliver electric current to the beams 168, 170.

The beams 168, 170 are electrically and mechanically coupled at their respective distal ends 171, 173 by member 172 to form an electric circuit. In an alternate embodiment, beams 168, 170 are electrically coupled to grounding tab 177. The grounding tab 177 electrically couples the beams 168, 170 to contact 179 on the substrate 152 in both the unactivated position (see FIG. 6) and the activated position (see FIG. 9). The grounding tab 177 can be a flexible member or a spring member that is adapted to maintain contact with the contact 179. A grounding tab can be used with any of the embodiments disclosed herein.

The beams 168, 170 are physically separated from the first layer 160 so that the member 172 is located above the substrate 152. One or more dimples 174 may optionally be formed in the member 172 to support the beams 168, 170 above the substrate 152. In an alternate embodiment, the dimples or bumps 174 can be formed on the substrate 152. In an unactivated position illustrated in FIG. 6, the beams 168, 170 are generally parallel to the surface of the substrate 152. As used herein, the "unactivated position" refers to a condition in which substantially no current is passed through the circuit formed by the beam 168, the member 172 and the beam 170.

A third layer 180 of polysilicon is configured with an anchor 182 attached to the substrate 152 near the anchor 164, 166. The third layer 180 forms upper beam 184 cantilevered from the anchor 182 with a free end 183 mechanically coupled to the member 172 above the beams 168, 170. In some embodiments, reinforcing member 185 is formed in the upper beam 184 along at least a portion of its length and flexure 187 is optionally formed in the upper beam 184 near the anchor 182. In one embodiment, a metal layer is optionally applied to the upper beam 184.

As used herein, "reinforcing member" refers to one or more ridges, bumps, grooves or other structural features that increase resistance to bending. The reinforcing members are preferably formed during the MUMPs process so that it is integrally formed with the upper beam 184. In the illustrated embodiment, the reinforcing member 185 is a curvilinear ridge (see FIG. 8) extending along a portion of the upper beam 184, although it could be rectangular, square, triangular or a variety of other shapes. Additionally, the reinforcing member 185 can be located in the center of the upper beam 184 or along the edges thereof. Multiple reinforcing members may also be used.

Figure 7:
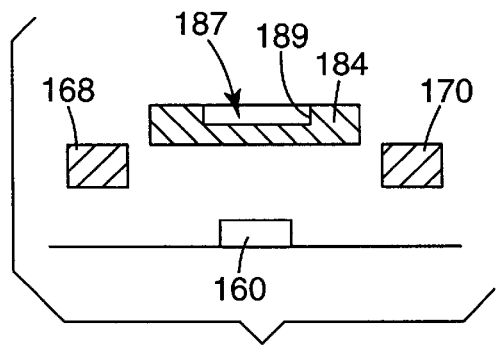
FIG. 7 is a sectional view of the thermal actuator of FIG. 5

As used herein, "flexure" refers to a recess, depression, hole, slot, cut-out, location of narrowed, thinned or weakened material, alternate material or other structural features or material change that provides controlled bending in a particular location. Alternate materials suitable for use as a flexure include polysilicon, metal or polymeric material. As best illustrated in FIG. 7, the flexure 187 is a recess 189. The recess 189 comprises the weakest section of the upper beam 184, and hence, the location most likely to bend during actuation of the thermal actuator 150.

The rigidity of the upper beam 184 relative to the rigidity of the flexure 187 determines to a large extent the magnitude (location and direction) of the controlled bending of the thermal actuator 150. In one embodiment, the reinforcing member 185 is used in combination with the flexure 187. In another embodiment, the reinforcing member 185 extends along a portion of the upper beam 184, but no flexure is used. The portion of the upper beam 184 without the reinforcing member 185 is the location of controlled bending. In yet another alternate embodiment, the flexure 187 is formed in the beam 184 without the reinforcing member 185 such that the flexure 187 is the location of controlled bending. The thermal actuator 150 can also be use without either the reinforcing member 185 or the flexure 187.

A via 188 is formed at the member 172 and/or free end 183 to mechanically couple the free end 183 of the upper beam 184 to the member 172. Other structures may be used to mechanically couple the upper beam 184 to the member 172. The upper beam 184 is generally parallel to surface of the substrate 152 in the unactivated position.

Figure 9:
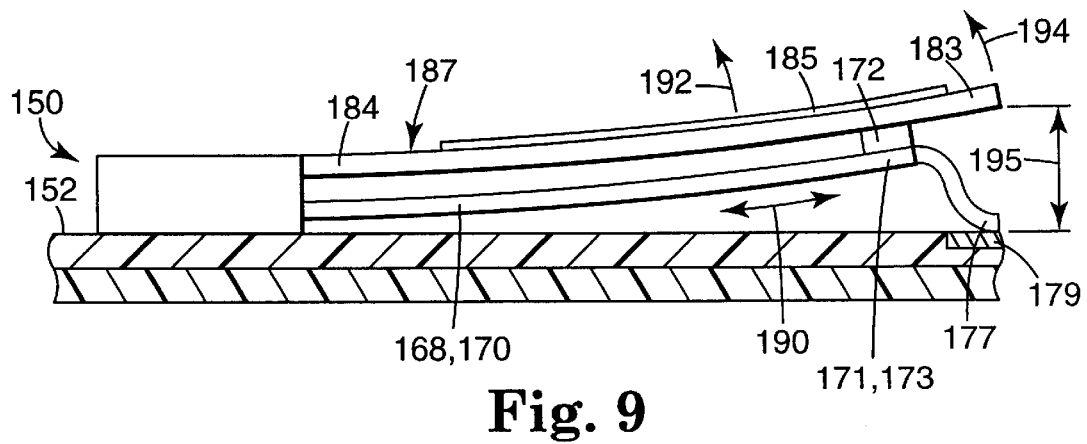
FIG. 9 is a side view of the thermal actuator of FIG. 5 in an actuated position.

FIG. 9 is a side sectional view of the thermal actuator 150 of FIG. 5 in an out-of-plane or activated position. The "activated position" refers to applying electrical current to one or more of the beams. In the illustrated embodiment, electric current is applied to the circuit formed by the beam 168, the member 172, and the beam 170 (see FIG. 5). The beams 168, 170 are the "hot arms" and the beam 184 is the cold arm. As used herein, "hot arm" or "hot arms" refer to beams or members that have a higher current density than the cold arm(s) when a voltage is applied. "Cold arm" or "cold arms" refer to beams or members that have a lower current density than the hot arm(s) when a voltage is applied. In some embodiments, the cold arm(s) has a current density of zero. Consequently, the hot arms have greater thermal expansion than the cold arms.

The electric current heats the hot arms 168, 170 and causes them to increase in length in the direction 190. Expansion of the beams 168, 170 causes the free end 183 of the thermal actuator 150 to move in an upward arc 192, generating lifting force 194 and displacement 195. The cold arm 184, however, is fixed at the anchor 182 and electrically isolated so that the current entirely or substantially passes through the circuit formed by the hot arms 168, 170 and the member 172. The shape of the free end 183 can be modified to slide efficiently under the supports 57, 86 of the respective mirrors 22, 72.

Due to the height difference between the cold arm 184 and the hot arms 168, 170, a moment is exerted on the cold arm 184 near the anchor 182. The cold arm 184 bends near the flexure 187, resulting in greater displacement near the free end 183 (and the mirrors 22, 72) than would otherwise occur without the flexure 187. The hot arms 168, 170 also bend easily, offering little resistance to the motion 192 of the cold arm 184. The reinforcing member 185 resists bending along the cold arm 184 that would normally occur near the member 172 when a load is placed at the free end 183. In the illustrated embodiment, the displacement 195 can be from about 0.5 micrometers to about 4 micrometers. When the current is terminated, the thermal actuator 150 returns to its unactivated position illustrated in FIG. 6.

In an alternate embodiment, the anchor 182 and the cold arm 184 are electrically coupled to the member 172. At least a portion of the current flowing through the hot arms 168, 170 flows along the cold arm 184 to the anchor 182. It is also possible that all of the current flowing through the hot arms 168, 170 exits the thermal actuator 150 through the cold arm 184. The material and/or geometry of the cold arm 184 is adapted to have a lower current density than the hot arms 168, 170, even when the same voltage is applied. In one embodiment, the cold arm 184 is formed from a material with a coefficient of linear thermal expansion less than the coefficient of linear thermal expansion of the hot arms 168, 170. In yet another embodiment, the cold arm 184 is provided with a lower electrical resistivity by having a larger cross sectional area. In another embodiment, a conductive layer is provided on the cold arm 184. Suitable conductive materials include metals such as aluminum, copper, tungsten, gold, or silver, semiconductors, and doped organic conductive polymers such as polyacetylene, polyaniline, polypyrrole, polythiophene, polyEDOT and derivatives or combinations thereof. Consequently, the net expansion of the hot arms 168, 170 is greater than the expansion of the cold arm 184.

In another alternate embodiment, all or a portion of the current flowing through the hot arms 168, 170 flows through grounding tab 177 to the contact 179 on the substrate 152. The grounding tab 177 maintains electrical and physical contact with the contact 179 as the thermal actuator 150 moves from the unactivated position to the activated position illustrated in FIG. 9.

Figure 10:
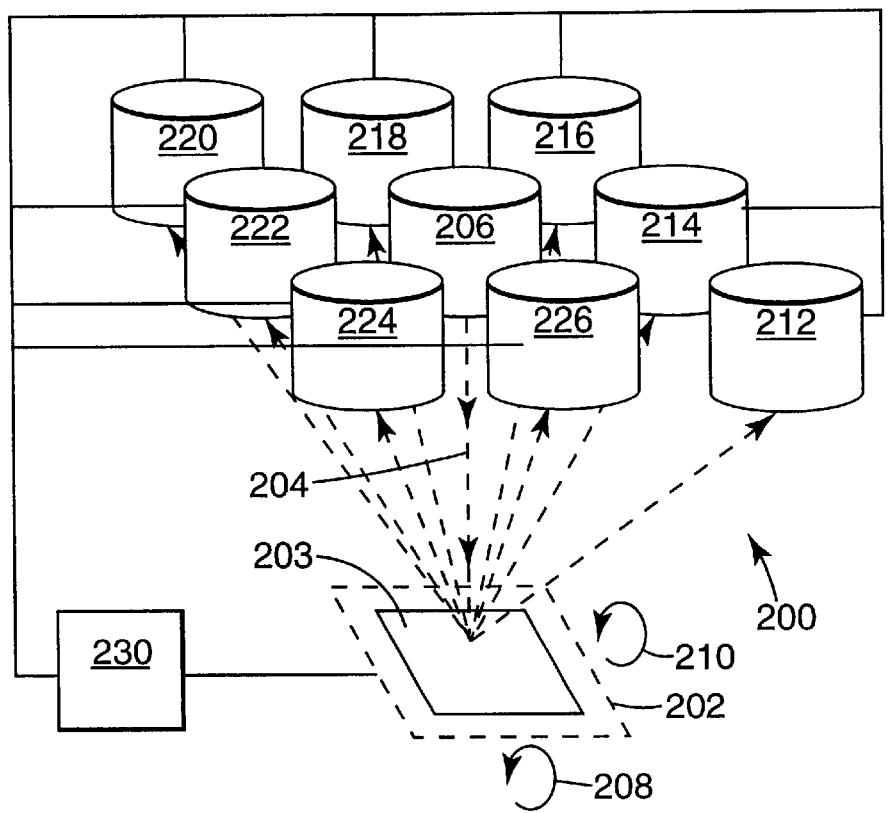
FIG. 10 is a schematic illustration of an optical switch in accordance with the present invention.

FIG. 10 is a schematic illustration of an optical switch 200 utilizing a micro-mechanical device 202 in accordance with the present invention. An optical signal 204 from incoming optical fiber 206 strikes the gimbaled micro-mirror 203, preferably at a right angle. The gimbaled micro-mirror 203 rotates in pitch 208 and/or roll 210 to redirect the optical signal 204 to any of the outgoing signal fibers 212, 214, 216, 218, 220, 222, 224, 226. Since the gimbaled micro-mirror 203 can move in two degrees of freedom, it is possible to arrange the outgoing fibers into a n×n array generally surrounding the incoming optical fiber 206.

In one embodiment, controller 230 monitors the signal strength reflected to the outgoing signal fibers 212, 214, 216, 218, 220, 222, 224, 226. A closed-loop positioning algorithm permits the controller 230 to adjust the position of the gimbaled micro-mirror 203 to maximize the signal strength. The present micro-mechanical devices may be used in any of a variety of optical switch architectures, such as an on/off switch (optical gate), 2×2 switch, one×n switch, or a variety of other architectures. The present optical switch 200 is typically part of an optical communication system.

All of the patents and patent applications disclosed herein, including those set forth in the Background of the Invention, are hereby incorporated by reference. Although specific embodiments of this invention have been shown and described herein, it is to be understood that these embodiments are merely illustrative of the many possible specific arrangements that can be devised in application of the principles of the invention. Numerous and varied other arrangements can be devised in accordance with these principles by those of ordinary skill in the art without departing from the scope and spirit of the invention. For example, any of the flexures, reinforcing structures, anchor locations and beam configurations disclosed herein can be combined to produce numerous thermal actuators.

What is claimed is:

1. A micro-mechanical device for steering beams of light comprising:
   at least one mirror constructed on a surface of the substrate;
   at least one gimbal mechanically coupling the mirror to the surface of the substrate in a neutral position; and
   at least one thermal actuator constructed on the surface of the substrate adjacent to the mirror, the thermal actuator having a free end positioned to engage the mirror, but not attached to the mirror.

2. The device of claim 1 wherein the free end is located between the mirror and the surface of the substrate.

3. The device of claim 1 wherein the thermal actuator is adapted to move the mirror out of the neutral position.

4. The device of claim 1 wherein the thermal actuator comprises two or more thermal actuators adapted to move the mirror through at least two degrees of freedom relative to the surface of the substrate.

5. The device of claim 1 wherein the neutral position comprises an in-plane configuration.

6. The device of claim 1 wherein the mirror is in an out-of-plane configuration when the thermal actuators are in an activated position.

7. The device of claim 1 wherein the mirror is in an in-plane configuration when the thermal actuators are in an unactivated position.

8. The device of claim 1 wherein the gimbal suspends the mirror over the surface of the substrate.

9. The device of claim 1 comprising:
   a plurality of supports extending distally from a perimeter of the mirror; and
   a plurality of pads attached to the supports positioned to engage with the surface of the substrate when the thermal actuators are in an unactivated position.

10. The device of claim 1 comprising a plurality of supports extending distally from a perimeter of the mirror comprising end stops.

11. The device of claim 1 wherein the mirror is rectangular and a thermal actuator is located at each corner thereof.

12. The device of claim 1 wherein the gimbal comprises:
    at least one first arm extending distally from the mirror;
    a member attached to a distal end of the first arm; and
    a second arm extending from the member to an anchor on the surface of the substrate.

13. The device of claim 12 wherein the first arm is perpendicular to the mirror.

14. The device of claim 12 wherein the first arm is parallel to the second arm.

15. The device of claim 1 wherein the at least one mirror comprises an array of mirrors constructed on the surface of the substrate.

16. The device of claim 1 wherein the free end slides along a lower surface of the mirror during movement between the unactivated position and the activated position.

17. The device of claim 1 wherein the mirror comprises a plurality of outriggers positioned to mechanically engage with the free ends of the thermal actuators.

18. The device of claim 1 wherein the thermal actuator comprises:
    at least one hot arm having a first end anchored to the surface and a distal end located above the surface;
    a cold arm having a first end anchored to the surface and a distal end, the cold arm being located above the hot arm relative to the surface; and
    a member mechanically and electrically coupling the distal ends of the hot and cold arms, the member comprising the free end configured to engage with the mirror when current is applied to at least the hot arm.

19. An optical switch comprising:
    at least one input optical fiber;
    one or more output optical fibers;
    a micro-mechanical device for directing an optical signal projecting from the input optical fiber to any of the output optical fibers, the micro-mechanical device comprising;
        at least one mirror constructed on a surface of the substrate and positioned to optically couple with the input optical fiber;
        at least one gimbal mechanically coupling the mirror to the surface of the substrate in a neutral position; and
        at least one thermal actuator constructed on the surface of the substrate adjacent to the mirror, the thermal actuators having a free end positioned to engage the mirror, but is not attached to the mirror.

20. The optical switch of claim 19 wherein the thermal actuator is adapted to move the mirror through two degrees of freedom relative to the surface of the substrate.

* * * * *